(12) United States Patent
Xie et al.

(10) Patent No.: US 10,287,437 B2
(45) Date of Patent: May 14, 2019

(54) PREPARATION METHOD AND APPLICATION OF PEARLESCENT PIGMENT

(71) Applicant: FUJIAN KUNCAI MATERIAL TECHNOLOGY CO., LTD., Fujian (CN)

(72) Inventors: Bingkun Xie, Fujian (CN); Zhicheng Cao, Fujian (CN)

(73) Assignee: Fujian Kuncai Material Technology Co., Ltd., Fujian (CN)

(*) Notice: Subject to any disclaimer, the term of this patent is extended or adjusted under 35 U.S.C. 154(b) by 0 days.

(21) Appl. No.: 15/124,538

(22) PCT Filed: Feb. 4, 2015

(86) PCT No.: PCT/CN2015/072234
§ 371 (c)(1),
(2) Date: Sep. 8, 2016

(87) PCT Pub. No.: WO2015/135402
PCT Pub. Date: Sep. 17, 2015

(65) Prior Publication Data
US 2017/0022367 A1    Jan. 26, 2017

(30) Foreign Application Priority Data
Mar. 10, 2014    (CN) .......................... 2014 1 0085247

(51) Int. Cl.
*C09C 1/00* (2006.01)
*C09D 5/36* (2006.01)
*C09D 7/40* (2018.01)

(52) U.S. Cl.
CPC .......... *C09C 1/0021* (2013.01); *C09C 1/0015* (2013.01); *C09D 5/36* (2013.01);
(Continued)

(58) Field of Classification Search
None
See application file for complete search history.

(56) References Cited

U.S. PATENT DOCUMENTS

| | | | | |
|---|---|---|---|---|
| 6,139,615 A | * | 10/2000 | Jones | C09C 1/0015 106/417 |
| 2004/0096579 A1 | * | 5/2004 | Kil-Wan | C09C 1/0015 106/417 |

(Continued)

FOREIGN PATENT DOCUMENTS

| CN | 101085882 A | 12/2007 |
|---|---|---|
| CN | 101434759 A | 5/2009 |

(Continued)

OTHER PUBLICATIONS

International Search Report (PCT/ISA/210) dated Apr. 10, 2015, by the Chinese Patent Office as the International Searching Authority for International Application No. PCT/CN2015/072234.
(Continued)

*Primary Examiner* — Colleen P Dunn
*Assistant Examiner* — Ross J Christie

(57) ABSTRACT

The present invention relates to a method for preparing pearlescent pigment through metal oxide coating based on a sheet-like substrate, and the obtained pearlescent pigment. The present invention further relates to a method for preparing pearlescent pigment through coating a sheet-like substrate by hydrolyzing metal salt under an acid condition, wherein a pH value is adjusted by using inorganics such as MgO, MgOH or $CaCO_3$ that does not dissolve in water but can dissolve through reacting with an acid. According to the method, no free metal oxide is generated when the metal salt is hydrolyzed, so that the production cost is reduced, product quality is improved, problems possibly generated in an
(Continued)

application process of the product are avoided, and a production process is more environment-friendly.

9 Claims, 1 Drawing Sheet

(52) U.S. Cl.
CPC .......... *C09D 7/70* (2018.01); *C09C 2200/102* (2013.01); *C09C 2220/106* (2013.01)

(56) References Cited

U.S. PATENT DOCUMENTS

| | | | |
|---|---|---|---|
| 2008/0047470 A1 | 2/2008 | Pfaff et al. | |
| 2011/0118384 A1* | 5/2011 | Bugnon | C09C 1/0021 523/171 |

FOREIGN PATENT DOCUMENTS

| | | | | |
|---|---|---|---|---|
| CN | 101646626 A | 2/2010 | | |
| EP | 1 443 083 A1 | 8/2004 | | |
| JP | WO 0159014 A2 * | 8/2001 | ........... | C09C 1/0015 |

OTHER PUBLICATIONS

Written Opinion (PCT/ISA/237) dated Apr. 10, 2015, by the Chinese Patent Office as the International Searching Authority for International Application No. PCT/CN2015/072234.

* cited by examiner

PREPARATION METHOD AND APPLICATION OF PEARLESCENT PIGMENT

TECHNICAL FIELD

The present invention relates to a method for preparing pearlescent pigment, in particular to a method for preparing pearlescent pigment without free particles.

BACKGROUND ART

A process by which pigment with pearlescent effect is prepared using sheet-like materials as a substrate and single-layer or multilayer oxides as a coating has been adopted for several decades, is highly mature, and has a large amount of patents. A process that forced hydrolysis coating is performed through water-soluble metal salt at a preset PH value is a commonly used technique, since the water-soluble metal salt is acidic generally, and alkali must be added during continuous addition of the water-soluble metal salt to balance the PH value, otherwise the hydrolysis cannot be performed continuously. Metal hydroxides, such as NaOH and KOH, are mainly used to neutralize acid and alkali currently. Aqueous ammonia ($NH_3.H_2O$), sodium carbonate ($Na_2CO_3$) or the like can also be used to control the PH value to perform hydrolysis coating. The abovementioned alkalis all can dissolve in water, and are generally made into a water solution before added to a reaction kettle in production. Even though added in a solid form, the water-soluble alkali is dissolved to form a solution after entering the reaction kettle, and also provides required hydroxyl ($OH^-$) to neutralize the acid ($H^+$) to achieve a purpose of maintaining a stable PH value. The process has the following defects: when the alkali enters the reaction kettle, local overhigh alkali concentration occurs unavoidably, and in addition to neutralizing the acid, the local overhigh-concentration alkali ($OH^-$) may further combine with coating metal ions (such as $Ti^{4+}$, $TiO^{2+}$, $Fe^{3+}$ and $Sn^{4+}$) to produce metal hydroxide (or hydrated metal oxide) sediment, and does not completely coat the sheet-like substrate, thus forming free substances. Since the free substances have high absorption capability due to a small size (nanoscale generally) and a large specific surface area, the hydrolysis coating compete between the free particles and the sheet-like substrate subsequently. Once being formed, the free particles are removed only by subsequent steps of filtering, washing, gas flow classifying and the like, since the free particles can lower colourity of the pearlescent pigment and cause various problems during application. Even though the free particles can be reduced by stirring and a strict control of a feeding speed, the free particles cannot be eliminated completely by the foregoing process.

SUMMARY OF THE INVENTION

The present invention provides a novel technology that adopts water-insoluble materials to control a PH value, and prevents direct reaction of alkali and metal ions, preparing pearlescent pigment without free particles. Since the material added into a reaction kettle to neutralize an acid does not dissolve in water, $OH^-$ is not provided directly, avoiding local overhigh alkali ($OH^-$) concentration, and the material (such as MgO) for neutralizing the acid only reacts with an acid ($H^+$) rather than a metal ion (such as $TiO^{2+}$). Salt (such as $MgCl_2$) generated through reaction of the water-insoluble material (such as MgO) and acid may dissolve in water and be removed by subsequent filtering and washing, thus preparing high-quality pearlescent pigment without free particles.

Thus, according to a first embodiment of the present invention, a method for preparing pearlescent pigment is provided, wherein the method comprises: A) in the presence of sheet-like substrates and at a set pH value which allows metal salt for coating to be hydrolyzed, performing hydrolysis coating by adding the metal salt for coating and inorganics simultaneously into water, wherein the inorganics does not dissolve in water but can dissolve through reacting with an acid, and the inorganics is used to adjust or maintain a pH value of a hydrolysis system.

Preferably, relative to 1000 parts by weight of the sheet-like substrates, 350-1500 and preferable 450-1350 parts by weight of the metal salt and 300-1400, and preferable 400-1200 parts by weight of the inorganics are used. Preferably, the sheet-like substrates are used in a slurry form of 5-30 wt % and preferably 10 to 15 wt % (wt % based on solid). Preferably, the particle size of the sheet-like substrates is 10-60 micrometers. After hydrolysis coating, the thickness of the resulting coating is generally 10-100 nm, preferably 30-60 nm, and more preferably 40-50 nm.

Preferably, the set pH value is within a range of 0.5-3, preferably 0.7-2.5, more preferably 0.8-2 and still more preferably 0.9-1.5 (for example 1, 1.1, 1.2 or 1.3).

Preferably, the inorganics which does not dissolve in water but can dissolve through reacting with an acid is an alkaline-earth metal compound, and more preferably an alkaline-earth metal oxide or carbonate. The inorganics is used preferably in a form of a water solution or slurry of 5-30 wt %, and more preferably 10-20 wt %. The particle size of the inorganics is preferably below 200 meshes, and more preferably 200-250 meshes or 200-300 meshes.

Generally, the foregoing method further comprises the following steps of: B) filtering, C) washing, D) drying and E) calcining.

Preferably, the metal salt for coating is added in a form of a water solution; and/or, the inorganics that does not dissolve in water but can dissolve through reacting with the acid is added in a form of slurry formed in water. The metal salt is used at a concentration of preferably 1-4 mol/L, and more preferably 1.5-3 mol/L.

Preferably, the adding rate of the inorganics that does not dissolve in water but can dissolve through reacting with the acid is controlled in the step A) so that the pH value of the hydrolysis system is kept stable or basically stable.

Preferably, the sheet-like substrates in the present invention are selected from one or two or more of natural mica, synthetic mica, glass sheet, sheet-like aluminum oxide and sheet metal.

Preferably, the metal salt for coating is selected from one or two or more of $TiCl_4$, $TiOCl_2$, $FeCl_3$ or $SnCl_4$.

More preferably, the inorganics is selected from magnesium oxide, magnesium hydroxide, calcium carbonate or a mixture thereof.

Preferably, after calcined, the coating material becomes one of the following components: anatase $TiO_2$, tin dioxide $SnO_2$, rutile $TiO_2$, hematite $Fe_2O_3$, $TiO_2+FeO_3$, $SnO_2+TiO_2+Fe_2O_3$, $SnO_2+Fe_2O_3$, Ti and Fe mixed oxide, and Sn, Ti and Fe mixed oxide.

The amount of the metal salt and inorganics can be determined by a color of a product to be coated, for example, when inorganics is MgO and metal salt is $TiCl_4$, if a product is silver white, relative to 1000 parts by weight of the sheet-like substrates, 370-430 parts by weight (for example, 400 parts by weight) of the inorganics, and 420-480 parts by weight of the metal salt are adopted. Hereinafter, the color of the product vary from golden yellow to red, blue and green, with the amount of the inorganics and metal salt increasing successively. When the product is green, for example, relative to 1000 parts by weight of the sheet-like substrates, 1100-1300 parts by weight of the inorganics and 1300-1400 parts by weight of the metal salt are adopted.

According to a second embodiment of the present invention, the pearlescent pigment obtained by the above method is provided.

According to a third embodiment of the present invention, the use of the above-said pearlescent pigment in paints, coatings, printing ink, plastics, ceramic materials, leather coloration, wallpaper, powder coatings or cosmetics is provided.

The advantages of the present invention are as follows:

The pearlescent pigment obtained in the present invention almost has no free particles, with good quality, desirable color and finish degree.

DETAILED DESCRIPTION OF THE INVENTION

Figure 1:
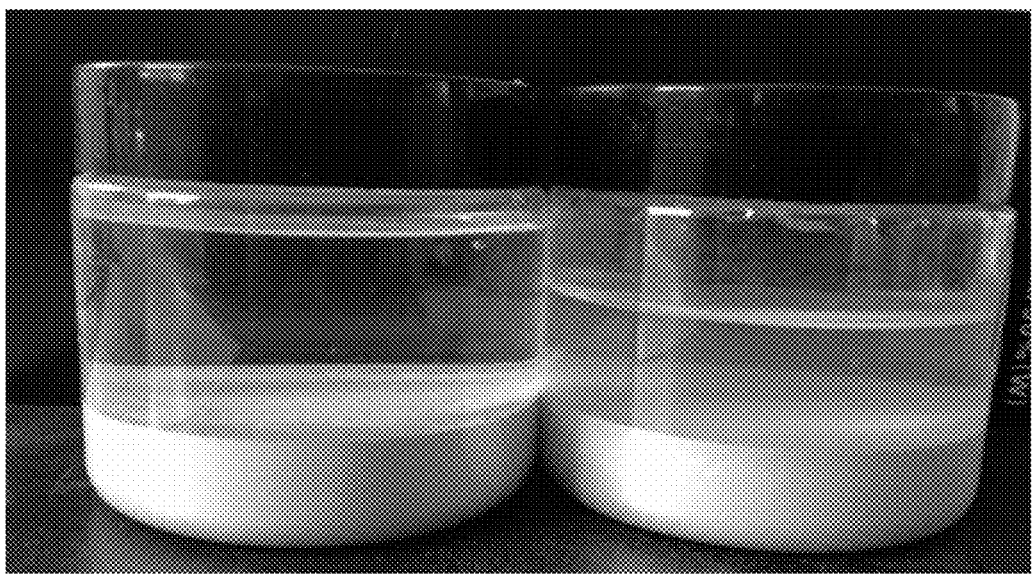
FIG. 1 is a situation where hydrolysis coating slurry samples prepared by a new process (left) of the present invention and that by a conventional process (right) are respectively placed in glass bottles after a certain time of resting and sedimentation.

The following examples are used to make detailed description of, rather than limitation on, the present invention.

EXAMPLE 1

1000 kg natural mica substrates with particle diameters $D_{10}=10$ μm, $D_{50}=25$ μm, $D_{90}=60$ μm are added to 10000 L deionized water (the reaction kettle is 20000 L), stirred and heated to 80° C., adjusting to pH value of 1.0 by using 1:1 hydrochloric acid. MgO slurry is prepared: 1000 kg 99% MgO is added to 5000 L water and stirred to prepare a slurry with total solid concentration of 20%. A particle diameter of less than 200 mesh is chosen to prevent the prepared slurry from sedimentation. At the start of hydrolysis coating, a titanium solution pump and an MgO slurry pump are operated simultaneously, and the pH value is automatically controlled to 1.0 by using a pH meter. A titanium solution is formulated with $TiCl_4$ having purity of not less than 99% and water with a proportion of water to $TiCl_4$ of 1:1 to prepare a titanium tetrachloride solution with the concentration of 2 mol/L, which may generate HCl gas when diluting. The released HCl gas is absorbed with water to obtain hydrochloric acid. Enough hydrochloric acid is added to prevent the diluted $TiCl_4$ from hydrolytic spoilage. The pH value is constantly 1.0 by simultaneously pumping the titanium solution and MgO slurry to the reaction kettle. The added titanium solution constantly forms a coating on the mica substrates by hydrolysis, when the pH value is 1.0. After filtering, washing and calcining, pearlescent products having silvery white, iridescence and the like are obtained. The amount of the $TiCl_4$ solution determines the color of the final product to be golden yellow, orange, red, purple, blue, green and so on.

| Color of product | Mica, kg | Titanium solution with the concentration of 2 mol/L, liter | MgO slurry with total solid concentration of 20%, liter | $TiO_2$ coating thickness, nm |
|---|---|---|---|---|
| Silvery white | 1000 | 1800 ($TiCl_4$ with the purity of not less than 99%, 450 kg) | 2000 (MgO, 400 kg) | 45 |
| Golden yellow | 1000 | 2800 | 3100 | 70 |
| Red | 1000 | 3800 | 4200 | 95 |
| Blue | 1000 | 4600 | 5100 | 115 |
| Green | 1000 | 5400 (99% $TiCl_4$, 1350 kg) | 6000 (MgO, 1200 kg) | 135 |

Compared with a conventional process (controlling pH value of the hydrolyzed coating with a base solution such as sodium hydroxide), the present invention provides a notable improvement in both lightness and chromaticity of products obtained through the new process thereof, and water consumption is saved by more than a half when filtering and watering. All these indicate that no free particles are generated in the new process when hydrolyzing; therefore, it is easier to filter and wash, and the product has better quality.

Another method showing that no free particles are generated in the products obtained by using the new process comprises: respectively placing hydrolyzed coatings obtained by using the new process and conventional process in glass bottles. An upper mother solution (left) of the hydrolyzed coating slurry samples prepared by using the new process is more transparent than that of the conventional process after a certain time of standing and sedimentation (see FIG. 1). It can be seen from FIG. 1 that a mother solution in the upper layer in dispersion of the present invention is transparent while a mother solution in the upper layer in dispersion of the prior art is hazy.

A method of evaluating sample quality by adopting a common coating swipe card or jet plate comprises: adding a proper amount of pearlescent powder samples (~10%) to resin or paint, and forming coating through the coating swipe card or jet plate, and drying. Data of color and finish degree is measured with an X-Rite MA68 color difference meter. Data is shown by using a CIE L*, a*, b* system. L* indicates brightness, c value ($c^2=a^2+b^2$) indicates color concentration.

EXAMPLE 2

Mica slurry, titanium solution and MgO slurry are prepared according to example 1, and a 20% $SnCl_4$ solution is prepared. 10 kg $SnCl_4$ is dissolved in 40 kg deionized water and pumped into a reaction kettle with a PH value of 1.0, then coated with titanium according to example 1, and the pH value is automatically controlled at 1.0 with MgO slurry. After a desired color is obtained, filtering, washing, drying and calcining are conducted to obtain a product. Taking a silver white product as examples, the weights of mica, 99% $TiCl_4$, $SnCl_4$ and MgO are respectively 1000:450:10:400 (kg). The thickness of the coating is about 45 nm.

The obtained product is pearlescent powder without free $TiO_2$.

EXAMPLE 3

As described in example 1, mica slurry and MgO slurry are prepared and pH value is adjusted to 3.0. A 10% $FeCl_3$ solution is prepared by dissolving 1000 kg $FeCl_3$ in 9000 L deionized water. a $FeCl_3$ solution and MgO slurry are simultaneously pumped and pH value is automatically controlled at 3.0. Pearlescent powder with metallic lustre can be obtained through filtering, washing and calcining after adding a proper amount of $FeCl_3$ solution to the reaction kettle. The amount of the $FeCl_3$ solution determines a color of the final product to be golden, orange, red, purple, blue, green and so on. Taking a brass golden product as an example, the amounts of mica, MgO and $FeCl_3$ by dry weight are respectively 1000:400:400 (kg). The thickness of the final coating is about 50 nm.

EXAMPLE 4

Mica slurry is prepared, and coated with $SnO_2$ according to example 2. With pH value adjusted to 3.0, iron coating is conducted according to example 3. Pearlescent powder with metallic lustre is obtained through filtering, washing and calcining. The amount of the $FeCl_3$ solution determines the color of the final product to be golden, orange, red, purple, blue, green and so on. Taking a brass golden product as an example, the actual amounts of mica, ferric trichloride (not titanium tetrachloride) and MgO and $SnCl_4$ are 1000:400:400:10 (kg). The thickness of the final coating is about 50 nm.

EXAMPLE 5

Titanium coating is performed according to example 1, and then iron coating is performed according to example 3 with pH value adjusted to 3.0. Pearlescent powder with two-layer coatings of titanium and iron with metallic lustre can be obtained through filtering, washing and calcining. The color of the final product is determined with the proportion and amount of titanium and iron.

EXAMPLE 6

Titanium coating is performed according to example 2 and then iron coating is performed according to example 3 to produce pearlescent pigment with 2 layers of titanium and iron.

EXAMPLE 7

A Ti liquid in example 1 and molten iron in example 3 are mixed according to the weight ratio of 100:10(Ti:Fe), mica slurry is prepared according to example 1, a PH value is adjusted to 2.5, and the pH value is automatically controlled at 2.5 by using MgO slurry so as to perform Ti—Fe mixed coating.

EXAMPLE 8

Tin coating is performed according to example 2, and then, Ti—Fe mixed coating is performed according to example 7.

EXAMPLE 9

The coating processes in examples 1-8 are repeated except that synthetic mica is used as the sheet-like substrates.

EXAMPLE 10

Example 9 is repeated except that glass sheets are used as the sheet-like substrates.

EXAMPLE 11

Example 9 is repeated except that aluminum oxide is used as the sheet-like substrates.

EXAMPLE 12

Example 9 is repeated except that metal sheets made of Al, Cu, Ni and various alloys are used as the sheet-like substrates.

EXAMPLE 13

Examples 1-12 are repeated except that the pH control agent MgO slurry is changed into $Mg(OH)_2$ slurry or a mixture of MgO slurry and $Mg(OH)_2$ slurry.

EXAMPLE 14

Example 13 is repeated except that the pH control agent is calcium carbonate ($CaCO_3$) slurry or a mixture of $CaCO_3$/MgO/$Mg(OH)_2$ at any ratio.

APPLICATION EXAMPLES

The pearlescent pigment prepared according to examples 1-14 is applied to the fields such as paints, coatings, printing ink, plastics, ceramic materials, leather coloration, wallpaper, powder coatings and cosmetics. For example, a coating with excellent color and luster can be prepared if the pearlescent pigment of the present invention is added to a paint or coating.

Application Example 1: Using Paint Spraying as an Example 4.0 g of the pearlescent pigment is accurately weighed, 4.0 g of butyl acetate and 8.0 g of polyester automobile coating resin are added, dispersed for 10 min after stirring in a stirrer, and 84.0 g of automobile coating resin systems are further added, and stirred for 5 min. The viscosity of the coating is regulated to Ford 4# cup for 14-15 s before spraying. A temperature of a spraying chamber is controlled at 25° C. and a relative humidity at 60% during spraying. With twice spray, a varnish is covered after flash drying for 10 min, and baked at 140° C. for 30 min after performing flash drying again.

Application Example 2: Using Injection Molding as an Example 200 g of polypropylene (PP) materials are accurately weighed and dried at 105° C., put into a sealed plastic bag, added with 1 ml of gloss oil (or dispersed oil), then, shaken to sufficiently mix the gloss oil and the polypropylene materials. 4.000 g of the pearlescent powder is accurately weighed by using an analytical balance, put into the sealed plastic bag, shaken again, and rubbed to sufficiently evenly disperse the pearlescent powder into PP particles.

After a temperature of a charging barrel reaches a set value (generally 180-200° C.), the prepared polypropylene materials are added into a hopper, and original remained materials in the charging barrel are extruded by virtue of rubber injection and rubber melting functions until new materials are extruded, wherein the extruded new materials need to have luster without impurities, dark spots, scorch or air bubbles, and meanwhile, nozzles are required to have no blocking phenomenon during rubber injection. Produced plastic sheets are stable and qualified products and automatic normal production can be carried out after front and back produced plastic sheets have no difference.

The invention claimed is:

1. A method for preparing pearlescent pigment, comprising: A) in the presence of sheet-like substrates and at a set pH value which allows metal salt for coating to be hydrolyzed, performing hydrolysis coating by adding the metal salt for coating and inorganics simultaneously into water, wherein the inorganics does not dissolve in water but can dissolve through reacting with an acid, and the inorganics is used to adjust or maintain a pH value of a hydrolysis system, wherein relative to 1000 parts by weight of the sheet-like substrates, 450-1350 parts by weight of the metal salt and 400-1200 parts by weight of the inorganics are used.

2. The method according to claim 1, wherein the set pH value is within a range of 0.5-3.

3. The method according to claim 1, wherein the inorganics that does not dissolve in water but can dissolve through reacting with an acid is alkaline-earth metal compound.

4. The method according to claim 1, wherein the method further comprises the following steps of: B) filtering, C) washing, D) drying and E) calcining.

5. The method according to claim 1, wherein the metal salt for coating is added in a form of a water solution; and/or, the inorganics that does not dissolve in water but can dissolve through reacting with the acid is added in a slurry form formed in water; and/or the adding rate of the inorganics that does not dissolve in water but can dissolve through reacting with the acid is controlled in the step A) so that the pH value of the hydrolysis system is kept stable.

6. The method according to claim 1, wherein the sheet-like substrates is selected from one or two or more of natural mica, synthetic mica, glass sheet, sheet-like aluminum oxide and sheet metal; and/or the metal salt for coating is selected from one or two or more of $TiCl_4$, $TiOCl_2$, $FeCl_3$ or $SnCl_4$; and/or the inorganics is selected from magnesium oxide, magnesium hydroxide, calcium carbonate or a mixture thereof.

7. The method according to claim 3, wherein after calcined, the metal salt for coating becomes one of the following components: anatase $TiO_2$, $SnO_2$, rutile $TiO_2$, $Fe_2O_3$, $TiO_2+FeO_3$, $SnO_2+TiO_2+Fe_2O_3$, $SnO_2+Fe_2O_3$, Ti and Fe mixed oxide and Sn, Ti and Fe mixed oxide.

8. The pearlescent pigment obtained by using the method according to claim 1.

9. Use of the pearlescent pigment according to claim 8 in the field of paints, printing ink, plastics, ceramic materials, leather coloration, wallpaper, powder coating or cosmetics.

* * * * *